June 1, 1965

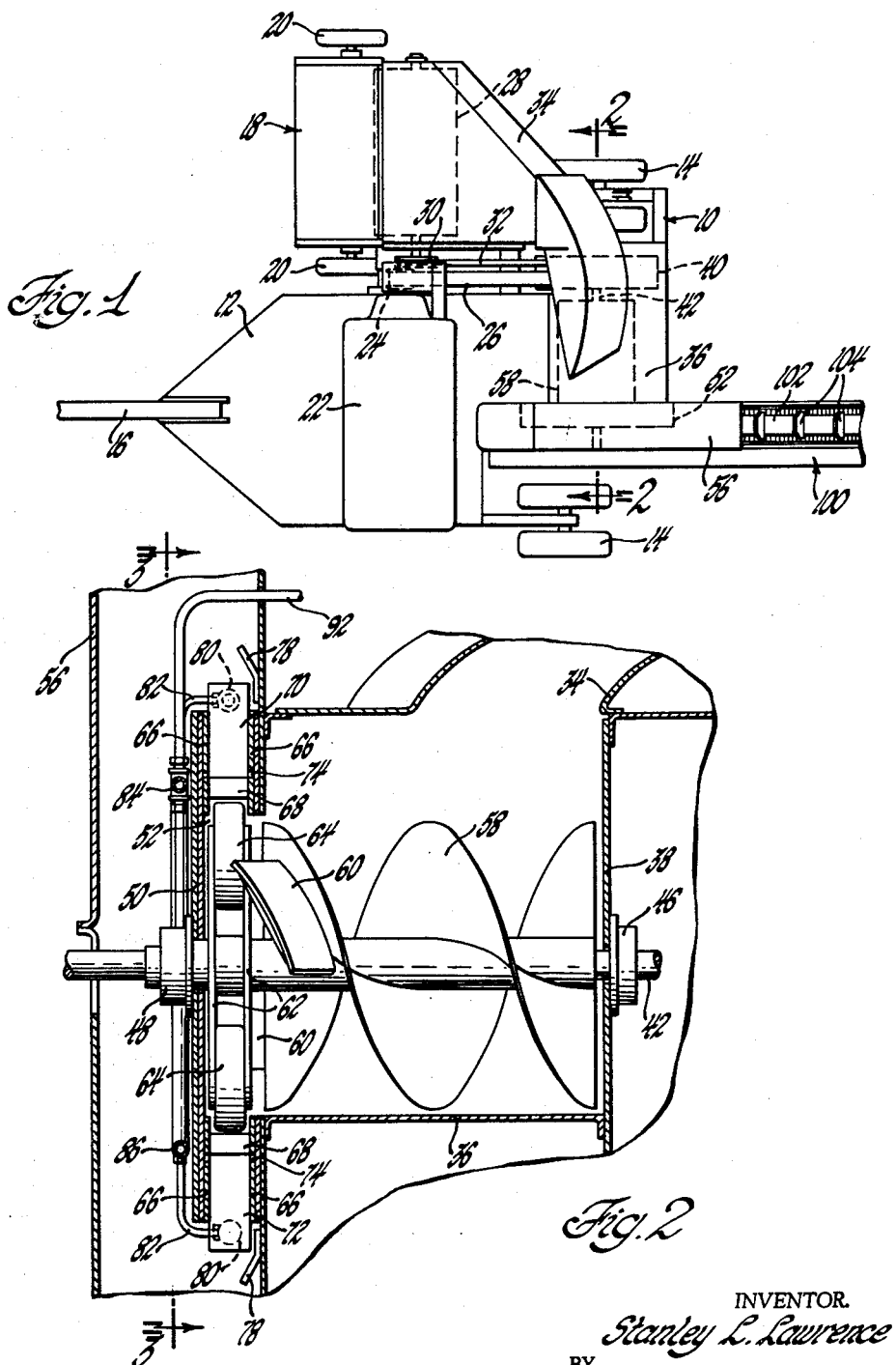

S. L. LAWRENCE 3,186,361

HAY WAFERING METHOD AND APPARATUS

Filed Nov. 5, 1962

INVENTOR.
Stanley L. Lawrence
BY
Barnard & McGlynn
ATTORNEYS 3,186,361
HAY WAFERING METHOD AND APPARATUS
Stanley L. Lawrence, Livonia, Mich., assignor to Massey-Ferguson Inc., Detroit, Mich., a corporation of Maryland
Filed Nov. 5, 1962, Ser. No. 235,471
16 Claims. (Cl. 107—14)

This invention relates to a method and apparatus for producing hay wafers and, in particular, to a method and apparatus for field wafering forage crops into hay wafers which is particularly characterized by an improved method and means for forming wafers at a substantially uniform rate.

In recent times, apparatus have been devised for field wafering forage crops into hay wafers comprising means for supplying hay, preferably preconditioned or processed, finely chopped, mixed and blended hay from a windrow within a field, to a hopper communicating with a wafering chamber at one end thereof which, in turn, communicates with the entrance ends of an annular series of axially open die cells, each of which is of variable converging cross sectional area from its entrance end to its exit end. Hydraulically operated motor assemblies have been associated with opposite movable walls of each of the die cells to adjust the variable cross sectional areas thereof to a substantially uniform extent and, hence, the resistance to an extrusion of hay being compressed therethrough. Rotary hay compaction or compression means has also been provided for compacting or compressing hay received within the wafering chamber into and through the die cells to form hay wafers. As a result, as the apparatus moves through a field of mown hay, a continuous extrusion of compressed or compacted hay emerges from the exit ends of the respective die cells, and each extrusion is adapted to be engaged with an ejection means adjacent the exit end of each of the die cells to break the respective extrusions of hay into hay wafers which then preferably fall upon conveyor means for removal from the apparatus.

In an apparatus of the type aforementioned, and with the convergent cross sectional areas of the die cells adjusted to some uniform extent as aforementioned, certain conditions may be encountered resulting in a non-uniform rate of flow of extrusions of hay through different die cells spaced from each other or different groups of such die cells. For example, in an apparatus of the type aforementioned in which the annular series of die cells are disposed in a substantially vertical plane or plane perpendicular to the ground over which the apparatus is traveling, the force of gravity alone has a tendency to resist equal feeding of hay to the entrance ends of the die cells; that is, under certain conditions, an uppermost substantially semi-circular group of die cells may receive less hay than a lower semi-circular group thereof. Consequently, given a certain rate of revolution of the rotary hay compaction or compression means aforementioned, extrusions of hay will emerge at a greater rate from the lower group of die cells than from the upper group thereof. As a consequence, the lower group of die cells are overworked, relatively speaking, and in the final analysis the overall production of wafers from the apparatus is non-uniform.

In view of the foregoing considerations, the present invention contemplates an improved method and apparatus of the general type aforementioned having an annular series of axially open die cells each including axially opposite entrance and exit ends and opposed movable wall means extending therebetween for adjustably varying the convergent cross sectional areas thereof between such entrance and exit ends, said series of die cells being circumferentially spaced about a rotary hay compaction means for compacting hay into and through the series of die cells to form wafers, and a plurality of fluid pressure operated motor means of the reciprocable piston and cylinder type, one of the motor means being operatively connected between the wall means of adjacent pairs of die cells and being operable to control the convergent cross sectional area thereof, and particularly characterized by means for supplying fluid under predetermined different pressures respectively to the aforementioned motor means associated with a plurality of distinct groups of adjacent die cells of the series thereof so that the die cells of each group are adjustable so as to be substantially uniformly convergent in cross sectional area while the convergent cross sectional area of the different groups differ to a predetermined extent to provide a substantially uniform rate of flow of hay extrusions through all the die cells of the series irrespective of variation in the quantity of hay supplied respectively thereto.

More specifically in this regard, the invention is particularly characterized by first and second separate fluid pressure manifolds, means communicating the respective manifolds to the aforementioned motor means of a first and second distinct group of adjacent die cells of the annular series thereof, and a suitable source of fluid under pressure applying predetermined different substantially static pressure heads on the respective motor means of each group thereof, whereby the die cells of each group thereof may be adjusted to be substantially uniformly convergent in cross sectional area while the uniform areas of the respective groups differ to a predetermined extent. As a result, the respective convergent cross sectional areas of the two groups of die cells compensate for variation in the availability of hay for compression or compaction therethrough resulting, in the final analysis, in a relatively uniform rate of movement of extrusions of hay from all of the die cells of the series, since the die cells receiving less hay than the cells of another group thereof have cross sectional areas which converge to a lesser extent than the cells of such other group.

In addition, the invention is further characterized by means including adjustable automatically operable pressure responsive valve means interconnecting the aforementioned first and second manifolds to maintain any preselected ratio between the pressures in the manifolds substantially constant. Consequently, if the preselected static pressure operating on the motor assemblies of the respective groups of die cells should change for one reason or another, the aforementioned valve means senses the change in ratio in the pressures to supply the higher pressure fluid from the high pressure manifold to the low pressure manifold to retain the desired ratio, the valve means being adjustable of course to establish any given ratio required for any given operation conditions.

In order to facilitate an understanding of the invention, a preferred embodiment thereof will now be described with reference to the accompanying drawings in which:

FIGURE 1 is a top plan view of a hay wafering apparatus embodying the invention;

FIGURE 2 is an enlarged fragmentary sectional view taken on line 2—2 of FIGURE 1.

Figure 3:
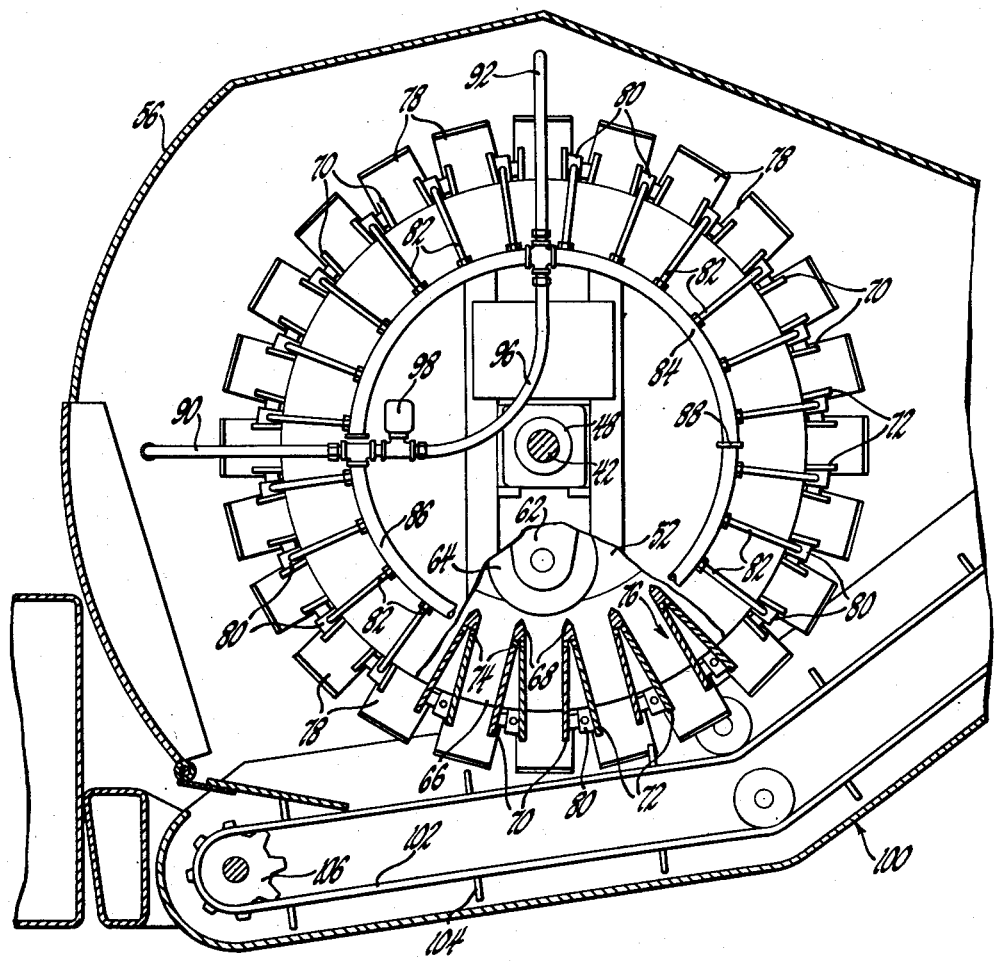
FIGURE 3 is an enlarged fragmentary sectional view taken on line 3—3 of FIGURE 2.

Referring now to the drawings, the numeral 10 in FIGURE 1 generally indicates a hay wafering apparatus comprising a frame 12 equipped with ground-engaging wheel means 14 in the usual manner, and a drawbar 16 adapted to be hitched to a suitable prime mover, such as an agricultural tractor, for drawing the frame along a field of mown hay. A pick-up mechanism for mown hay in the field is indicated generally at 18, is equipped with ground-engaging wheel means 20 in the usual manner and is suitably coupled in a conventional way to the frame of the apparatus so as to be towed by the latter. A suitable engine 22 is mounted on the frame 12 and includes an output shaft mounting a pulley means 24 entraining belt means 26 to drive various of the instrumentalities of the apparatus as will be pointed out hereinafter.

The apparatus aforedescribed is adapted to be towed along a field of mown or cut hay, preferably with the hay arranged in windrows and having been preconditioned or processed in a known manner so as to consist of finely chopped, mixed and blended stem and leaf components forming a substantially homogenous mass. As the apparatus is towed along the field, the hay mixture in a given windrow is adapted to be picked up in the pick-up mechanism 18 which preferably includes a rotary flail device indicated schematically at 28 and driven by a shaft connected to a pulley 30 driven by a belt means 32 from another pulley mechanism driven by the belt means 26 as will be pointed out hereinafter. Being of known construction, it will suffice to point out that the rotary flail device 28 includes a plurality of rapidly rotating flails or arms operable to direct the homogenized hay in an air stream into the delivery chute 34 of the pick-up mechanism which delivers the hay through a suitable opening in the side wall of a horizontally disposed cylindrical hopper 36 suitably secured on the frame 12 and including a closed end wall 38 and an open end wall axially opposite thereto and communicating with a wafering chamber to be described.

A large pulley or fly wheel 40 is secured to one end of a horizontally disposed drive shaft 42 exteriorly of the hopper adjacent its end wall 38, and is drivingly connected to the engine 22 by the aforementioned belt means 26 and further transmits power to the rotary flail device 28 by the belt means 32 aforedescribed. The drive shaft 42 is rotatably supported in suitable bearing means 46 adjacent the end wall 38 of the hopper and bearing means 48 adjacent a wall member 50 axially opposite the open end of hopper 36. As appears particularly in FIGURE 2, the drive shaft 42 extends horizontally through the hopper 36, through an annular vertically disposed wafering chamber 52 between the open end of the hopper and wall member 50, and therebeyond through an enlarged housing member 56 enclosing the aforementioned wafering chamber 52.

A two flight feed auger 58 is secured on the drive shaft 42 within the hopper 36 so as to be radially inwardly spaced from the cylindrical side wall thereof, while a pair of arcuate deflector vanes 60 project from one end of each auger flight into the wafering chamber 52. A pair of radially extending arms 62 have their central portions suitably rigidly secured to the drive shaft 42 for rotation therewith within the wafering chamber 52, and have journaled at the opposite ends thereof a pair of rollers 64. The deflector vanes 60 are disposed in advance of the path of rotation of the arms 62 and the respective rollers 64 within the wafering chamber for a purpose to appear hereinafter.

The wafering chamber 52 includes a pair of oppositely spaced annular end die wall members 66 suitably supported respectively on the wall member 50 and a wall of the housing member 56 adjacent the open end of the hopper 36. An annular or circumferentially spaced series of knife edges 68 extend between and are fixed to the end die wall members 66. An annular or circumferentially spaced series of pairs of side die wall members 70 and 72 are disposed between the end die wall members 66, and have their radially inner ends suitably pivotally connected as indicated at 74 to the radially outer edges of the respective knife edges 68 and diverge radially outwardly from such connection to form an annular or circumferentially spaced series of axially open die cells, indicated generally at 76, between end die wall members 66 and respective oppositely spaced and radially outwardly convergent side die wall members 70 and 72 of an adjacent pair thereof. As will be apparent, the axes of the respective die cells 76 are contained in a plane perpendicular to the axis of rotation of the drive shaft 42 or in a vertical plane with the apparatus traversing a horizontal surface. A plurality of ejection plates 78 are suitably rigidly secured to one wall of the housing member 56 in association with each of the respective die cells 76, and extend obliquely to the axes thereof as indicated particularly in FIGURE 2, whereby extrusions of hay compressed through the die cells will strike the ejection plates, be bent laterally of the axis of the die cells or to the left in FIGURE 2 to break the extrusions substantially at the exit ends of the die cells to form wafers.

The cross sectional areas of the respective die cells 76 converge radially outwardly from the hinge points 74 towards the exit ends thereof due to the fact that the respective oppositely disposed side die wall members 70 and 72 forming a part of each die cell converge in this manner as aforementioned. In order to adjust the degree of convergence of the cross sectional areas of each of the die cells, a hydraulically operated motor assembly 80 of the type comprising relatively reciprocable piston and cylinder elements is interposed between each hinged pair of side die wall members 70 and 72 to control their angular relationship about their hinge points 74.

Referring now particularly to FIGURE 3, it will be noted that each of the motor assemblies 80 associated with an upper substantially semi-circular group of adjacent die cells of the series thereof is individually connected by a conduit 82 to an arcuately shaped fluid manifold 84. In similar fashion, the motor assemblies associated with a lower substantially semi-circular group of adjacent die cells of the series thereof are each connected through individual conduits 82 to another arcuately shaped fluid manifold 86. The manifolds 84 and 86 may be assembled in one piece at the joint 88, but the latter completely separates them flow-wise.

The lower or high pressure manifold 86 is connected to a suitable source of fluid under one relatively high control pressure through the conduit 90, while the upper or low pressure manifold 84 is similarly connected to a suitable source of fluid under a relatively low control pressure through the conduit 92, such sources of pressure being controlled in a known manner by instruments and devices carried by the apparatus. In addition, the manifolds are interconnected by a conduit 96 including a conventional manually adjustable automatically operable pressure responsive control valve indicated at 98 and of any well known type, for example, comprising a manually adjustable spring biased valve member normally closed to prevent communication between manifolds, but being operable in response either to an increase in pressure in the high pressure manifold 86 or reduction in the pressure in the low pressure manifold 84 to open and communicate the high pressure manifold to the low pressure manifold. Therefore, the ratio of the preselected pressures introduced into the respective manifolds may be maintained substantially constant, and will depend upon the manual adjustment of the spring pressure of the regulator valve as is well known.

Thus, fluid under the relatively high pressure introduced in the lower or high pressure manifold 86 will act statically on each of the motor assemblies 80 associated therewith to vary, as the preselected pressure introduced in the manifold varies, the angular relationship between the respective pairs of the side die wall members 70 and 72 and the converging cross sectional areas of the respective die cells 76 associated therewith to a substantially equal or uniform extent. By the same token, fluid supplied to the upper or low pressure manifold 84 is supplied equally to the motor assemblies and die cells associated therewith so that the convergent cross sectional areas of the latter converge substantially uniformly or to an equal extent for any given pressure in the manifold. However, due to the different pressures of the fluids in manifolds 84 and 86, the cross sectional areas of the groups of die cells respectively associated therewith will converge to different extents; that is, the uniform cross sectional areas of the group of die cells connected to high pressure manifold 86 will be less than the uniform convergence of areas of the die cells connected to manifold 84.

As will be readily apparent particularly from FIGURES 2 and 3, the rollers 64 are positioned so as to be closely spaced to but not engage the knife edges 68 and the entrance ends to the respective die cells 76. Thus, hay fed continuously by the auger 58 from the hopper 36 into the wafering chamber 52 is laid across the knife edges 68 and the entrance ends of the respective die cells by the deflector vanes 60 in advance of the rotative paths of the rollers 64 which compress the hay, force it past the knife edges and compact it into and through the respective die cells upon successive rotative passes thereof to result in extrusions of hay emerging from each of the die cells, engaging the respective ejection plates 78 and being broken substantially at the exit ends of the respective die cells to form wafers which then fall toward the bottom of the annular housing 56.

During this feeding and compressing action, and due for example to the vertical disposition of the die cells, the upper group of die cells of the series thereof connected to the manifold 84 have cross sectional convergent areas which, although uniform among themselves, converge to a lesser extent than the substantially uniformly convergent cross sectional areas of the lower die cells connected to the manifold 86 as aforedescribed. Hence, although less hay is available for compaction through the upper series of die cells than the lower series thereof, the cross sectional areas of the respective groups of die cells are predisposed to result in extrusions of hay emerging therefrom at a substantially uniform rate. If, for one reason or the other, the preselected ratio of pressures in the manifolds 84 and 86 is disturbed by an increase in the pressure in the high pressure manifold 86 or decrease in the low pressure manifold 84, the regulator valve 98 may open automatically to communicate the high pressure manifold to the low pressure manifold to return to the preselected ratio of pressures desired.

The hay wafers broken from the extrusions emerging from the die cells and falling into the housing member 56 as aforedescribed fall upon one end of an elevator type conveyor 100 disposed beneath the bottom of the housing member, which conveyor includes belt means 102 equipped with spaced conveyor paddles 104 which pick up the wafers and convey them from the apparatus preferably into a trailing conveyance. The elevator type conveyor is preferably coupled to the engine 22 for drive thereof through a pulley secured to one extreme end of the drive shaft 42 exteriorly of the housing member 56 as indicated in FIGURE 2, and connected by belt means to a conveyor belt drive cog 106.

The embodiments of the invention in which an exclusive property or privilege is claimed are defined as follows:

1. A method of wafering hay comprising the steps of adjusting the convergent cross sectional areas between the entrance and exit ends of each of a series of die cells so that the cross sectional areas of a first group of die cells of said series are substantially uniformly convergent and differ to a predetermined extent from the substantially uniformly convergent cross sectional areas of a second group of die cells of said series to provide a substantially uniform rate of flow of hay through said groups of die cells irrespective of variation in the quantity of hay supplied respectively thereto, laying hay upon the entrance ends of the series of die cells, applying force to the hay opposite the entrance ends of the series of die cells to impact the hay into and therethrough to form extrusions of compacted hay emerging from the exit ends thereof, and breaking the extrusions emerging from the exit ends of the die cells into wafers.

2. A method of wafering hay comprising the steps of adjusting the convergent cross sectional area between the entrance and exit ends of each of an annular series of die cells so that the cross sectional areas of a first group of die cells of said series are substantially uniformly convergent and differ to a predetermined extent from the substantially uniformly convergent cross sectional areas of a second group of die cells of said series to provide a substantially uniform rate of flow of hay through said groups of die cells irrespective of variation in the quantity of hay supplied respectively thereto, laying hay upon the entrance ends of the series of die cells, applying force to the hay opposite the entrance ends of the series of die cells to compact the hay into and therethrough to form extrusions of compacted hay emerging from the exit ends thereof, and breaking the extrusions emerging from the exit ends of the die cells into wafers.

3. A method of wafering hay comprising the steps of adjusting the convergent cross sectional area between the entrance and exit ends of each of an annular series of die cells so that the cross sectional areas of a first group of adjacent die cells of said series are substantially uniformly convergent and differ to a predetermined extent from the substantially uniformly convergent cross sectional areas of a second group of adjacent die cells of said series to provide a substantially uniform rate of flow of hay through said groups of die cells irrespective of variation in the quantity of hay supplied respectively thereto, laying hay upon the entrance ends of the series of die cells, applying force successively to the hay opposite the entrance ends of the series of die cells to compact the hay into and therethrough to form extrusions of compacted hay emerging from the exit ends thereof, and breaking the extrusions emerging from the exit ends of the die cells into wafers.

4. A method of wafering hay comprising laying hay upon the entrance ends of a series of axially open die cells each being adjustably convergent in cross sectional area between its entrance end and an exit end axially opposite thereto, adjusting the convergent cross sectional areas of first and second groups of die cells of said series so that the die cells of each group are substantially uniformly convergent in cross sectional area and the substantially uniformly convergent cross sectional area of each group differs to a predetermined extent to provide a substantially uniform rate of flow of hay through said groups of die cells irrespective of variation in the quantity of hay supplied respectively thereto, applying force to the hay opposite the entrance ends of the die cells to compact the hay into and therethrough to form extrusions of compacted hay emerging from the exit ends thereof, and breaking the extrusions emerging from the exit ends of the die cells into wafers.

5. A method of wafering hay comprising laying hay upon the entrance ends of an annular series of axially open die cells each being adjustably convergent in cross sectional area between its entrance end and an exit end axially opposite thereto, adjusting the convergent cross sectional areas of first and second groups of adjacent die cells of said series so that the die cells of each group are substantially uniformly convergent in cross sectional area and the substantially uniformly convergent cross sectional area of each group differs to a predetermined extent to provide a substantially uniform rate of flow of hay through said groups of die cells irrespective of variation in the quantity of hay supplied respectively thereto, applying force successively to the hay opposite the entrance ends of the die cells to compact the hay into and therethrough to form extrusions of compacted hay emerging from the exit ends thereof, and breaking the extrusions emerging from the exit ends of the die cells into wafers.

6. A method of wafering hay comprising laying finely chopped and blended hay upon the entrance ends of an annular series of axially open die cells each being adjustably convergent in cross sectional area between its entrance end and an exit end axially opposite thereto, applying force successively to the hay opposite the entrance ends of the die cells to compact the hay into and therethrough to form extrusions of compacted hay emerging from the exit ends thereof, adjusting the convergent cross sectional areas of first and second groups of adjacent die cells of said series so that the die cells of each group are substantially uniformly convergent in cross sectional areas and the substantially uniformly convergent cross sectional area of each group differ to a predetermined extent to provide a substantially uniform rate of flow of extrusions of hay through said groups of die cells irrespective of variation in the quantity of hay supplied respectively thereto, and breaking the extrusions emerging from the exit ends of the die cells into wafers.

7. In an apparatus for making compressed hay wafers, and of the type having a series of axially open die cells each being adjustably convergent in cross sectional area being adjustably convergent in cross sectional area between axially opposite entrance and exit ends thereof, the entrance ends of said series of die cells being disposed opposite hay compaction means for compacting hay into and through said die cells to form wafers; the improvement comprising means for adjusting the convergent cross sectional areas of first and second groups of die cells of said series, whereby the die cells of each of said groups may be adjusted to be substantially uniformly convergent in cross sectional area while the substantially uniformly convergent cross sectional areas of each of said groups differ to a predetermined extent to provide a uniform rate of flow of hay through said groups of die cells irrespective of variation in the quantity of hay supplied respectively thereto.

8. The apparatus according to claim 7 further comprising means for automatically maintaining the ratio between said areas of said respective groups substantially constant.

9. In an apparatus for making compressed hay wafers, and of the type having an annular series of axially open die cells each being adjustably convergent in cross sectional area between axially opposite entrance and exit ends thereof, and a plurality of fluid pressure operated motor means operating upon said die cells to control the convergent cross sectional areas thereof, the entrance ends of said series of die cells being circumferentially spaced about a rotary hay compaction means for compacting hay into and through said die cells to form wafers; the improvement comprising means for supplying fluid under predetermined different pressures respectively to said motor means controlling first and second groups of adjacent die cells of said series, whereby the die cells of each of said groups may be adjusted to be substantially uniformly convergent in cross sectional area while the substantially uniformly convergent cross sectional areas of each of said groups differ to a predetermined extent to provide a uniform rate of flow of hay through said groups of die cells irrespective of variation in the quantity of hay supplied respectively thereto.

10. The apparatus according to claim 9 further comprising means including automatically operable pressure responsive valve means interconnecting said respective motor means of said first and second groups of die cells to maintain the ratio between said pressures substantially constant.

11. The apparatus according to claim 10 in which said pressure responsive valve means is adjustable to adjust the ratio between said pressures.

12. The apparatus according to claim 9 wherein said means for supplying fluid under predetermined different pressures comprises first and second separate fluid pressure manifolds, and conduit means communicating said motor means of said first and second groups of die cells respectively to said first and second manifolds.

13. The apparatus according to claim 9 in which said means for supplying fluid under predetermined different pressures comprises first and second separate fluid pressure manifolds, and individual conduit means communicating each of said motor means of said first and second groups of die cells respectively to said first and second manifolds, and further comprising means including adjustable automatically operable pressure responsive valve means interconnecting said first and second manifolds to maintain the ratio between said pressures substantially constant.

14. The apparatus according to claim 9 wherein each of said die cells include opposed movable wall means extending between the entrance and exit ends thereof, and said motor means are respectively operatively connected between said wall means of each adjacent pair of die cells of said series.

15. In an apparatus for making compressed hay wafers, and of the type including a plurality of die cells through which hay may be forced to form wafers, each of said die cells being adjustably convergent in cross sectional area; the improvement comprising means for adjusting the convergent cross sectional area of first and second groups of said die cells, whereby the die cells of each of said groups may be adjusted to be substantially uniformly convergent in cross sectional area while the substantially uniformly convergent cross sectional areas of each of said groups differ to a predetermined extent.

16. A method for making compressed hay wafers comprising forcing hay into and through a plurality of die cells which are adjustably convergent in cross sectional area, and adjusting the convergent cross sectional areas of said die cells so that the cross sectional areas of a first group thereof are substantially uniformly convergent and differ to a predetermined extent from the substantially uniformly convergent cross sectional areas of a second group thereof.

References Cited by the Examiner

UNITED STATES PATENTS

| | | | |
|---|---|---|---|
| 1,960,548 | 5/34 | Pfeiffer | 107—54 |
| 2,065,141 | 12/36 | Meakin | 107—54 |
| 2,425,237 | 8/47 | Field. | |
| 2,427,644 | 9/47 | Field. | |
| 2,958,900 | 11/60 | Meakin | 107—14 |
| 3,017,845 | 1/62 | Bonnafoux | 107—14 |
| 3,052,192 | 9/62 | Forth et al. | 107—14 |

OTHER REFERENCES

Agricultural Engineering S.671.A3, August 1961 (pages 412–415 and 423).

Western Livestock Journal, April 1961, pages 36 and 39.

WALTER A. SCHEEL, *Primary Examiner.*

UNITED STATES PATENT OFFICE
CERTIFICATE OF CORRECTION

Patent No. 3,186,361                         June 1, 1965

Stanley L. Lawrence

It is hereby certified that error appears in the above numbered patent requiring correction and that the said Letters Patent should read as corrected below.

Column 5, line 38, for "extrustions" read -- extrusions -- line 75, for "impact" read -- compact --; column 7, line 23, strike out "being adjustably convergent in cross sectional area".

Signed and sealed this 21st day of December 1965.

(SEAL)
Attest:

ERNEST W. SWIDER                                                            EDWARD J. BRENNER
Attesting Officer                                                                   Commissioner of Patents